United States Patent [19]

Eckberg

[11] 4,347,346

[45] Aug. 31, 1982

[54] SILICONE RELEASE COATINGS AND INHIBITORS

[75] Inventor: Richard P. Eckberg, Round Lake, N.Y.

[73] Assignee: General Electric Company, Waterford, N.Y.

[21] Appl. No.: 250,479

[22] Filed: Apr. 2, 1981

[51] Int. Cl.$^3$ .............................................. C08G 77/06
[52] U.S. Cl. .................................... 528/15; 427/387; 427/389.7; 427/391; 428/429; 428/447; 428/457; 528/31; 528/32
[58] Field of Search .............................. 528/15, 31, 32; 427/387, 389.7, 391; 428/429, 447, 457

[56] References Cited

U.S. PATENT DOCUMENTS

| | | | |
|---|---|---|---|
| B 528,962 | 2/1976 | Niemi | 528/25 |
| 3,445,420 | 5/1969 | Kookootsedes et al. | 528/15 |
| 3,989,666 | 11/1976 | Niemi | 528/25 |
| 4,024,091 | 5/1977 | Lee et al. | 528/15 |

Primary Examiner—Melvyn I. Marquis
Attorney, Agent, or Firm—Michael J. Doyle

[57] ABSTRACT

There is provided a platinum or rhodium catalyzed addition curable polyorganosiloxane release coating composition containing a dialkylacetylenedicarboxylte inhibitor for preventing premature gellation at ambient temperatures but which will cure at elevated temperatures via a hydrosilation reaction to form a coating capable of releasing materials from substrates which would normally adhere thereto.

19 Claims, No Drawings

SILICONE RELEASE COATINGS AND INHIBITORS

FIELD OF THE INVENTION

The present invention is related to inhibitors for precious metal catalyzed polysiloxane compositions which are particularly well suited for solventless silicone release coating applications.

BACKGROUND OF THE INVENTION

Silicone compositions have long been used for rendering surfaces nonadherent to materials which would normally adhere thereto. For a long time, it was necessary that these silicone coatings be applied as a dispersion within a solvent in order to control the viscosity of the coating material so as to be suitable for coating applications. However, although the solvent aids in the application of the coating, it is a highly inefficient process inasmuch as the solvent must thereafter be evaporated. The evaporation of solvents requires large expenditures of energy and pollution control requirements mandate that solvent vapors be prevented from escaping into the air. Removal and recovery of all the solvent entails considerable expenditure for apparatus and energy.

Thus, it has been noted that there is a need to provide a solventless coating composition which will, however, remain easy to apply to the substrate. Such solventless coating compositions are sometimes referred to as "100% solids" compositions. The absence of solvent in such compositions both lowers the amount of energy required to effect a cure and eliminates the need for expensive pollution abatement equipment. The composition of the present invention is a low viscosity polydiorganosiloxane fluid which can readily be coated onto a substrate by standard methods such as blade, press, brush or gravure and which will thermally cure onto the substrate to form a nonadherent surface.

Release coatings are useful for many applications whenever it is necessary to provide a surface or material which is relatively nonadherent to other materials which would normally adhere thereto. Silicone paper release compositions are widely used as coatings which release pressure-sensitive adhesives for labels, decorative laminates, transfer tapes, etc. Silicone release coatings on paper, polyethylene, Mylar, and other such substrates are also useful as non-stick surfaces for food handling and industrial packaging applications.

For example, when labels are coated with an adhesive, it is desirable that the paper backing be easily peeled away from the label when it is ready for use, yet the adhesive quality of the label should not be derogated by the fact that it has been peeled away from the substrate upon which it was stored. The same principle applies to certain types of adhesive tapes which come in rolls. It is necessary that the tape unroll easily and still maintain its adhesive characteristics. This can be accomplished by coating the nonadhesive side of the tape with a silicone release composition which will come into contact with the adhesive as the roll of tape is manufactured.

Two problems previously encountered with silicone compositions of the above-described type are related to premature gelation of the composition. Inasmuch as a typical composition can be made up of a vinyl chain-stopped base polymer, a crosslinking agent and a platinum metal catalyst, premature curing may occur over a length of time resulting in a product with unsatisfactory shelf-life. Furthermore, when the composition is ready for use, it is desirable that the catalyzed polymer composition have a sufficiently long pot-life to enable one skilled in the art to carry out the coating application. Thus, the coating composition of the present invention is provided with an inhibitor which effectively retards the hydrosilation addition cure reaction of these compositions at ambient temperature, but which does not retard the cure at elevated temperature.

An example of the use of an ethylenically unsaturated isocyanurate as an inhibitor for an addition curable room temperature vulcanizable organopolysiloxane elastomer may be found in U.S. Pat. No. 3,882,083 (Berger et al.) which is assigned to the same assignee as the present invention and is hereby incorporated by reference.

Silicone paper release coatings are low viscosity materials which are cured by SiH-olefin hydrosilation reactions catalyzed by platinum-metal compounds and are well known products. In order to prevent too rapid gelation of the catalyzed bath during the coating procedure, an inhibitor is added which prevents the crosslinking or curing reaction from taking place at low (i.e. room) temperatures, but which does not impede curing at higher (i.e. oven) temperature. Inhibitors which have been used in solventless paper release products include vinyl acetate, diallylmaleate and triallylisocyanurate (TAIC). The use of diallylmaleate as an inhibitor for paper release coatings is disclosed in U.S. Pat. No. 4,256,870 (Eckberg) which is hereby incorporated by reference. Use of vinyl acetate is objectionable as an inhibitor due to problems with toxicity and volatility. TAIC can be a satisfactory inhibitor, but it is not sufficiently soluble in solvent-free silicone fluids to permit its use at levels higher than approximately 2500 ppm. For these reasons it has been felt important that an improved inhibitor be discovered. The present invention discloses the discovery that dialkylacetylenedicarboxylates will function as effective inhibitors in solventless paper release systems.

Certain other acetylene derivatives have been recognized as effective inhibitors for platinum-catalyzed organopolysiloxane compositions, as described in U.S. Pat. No. 3,445,420. However, the disclosure relating to acetylenic inhibitors specifically excludes any acetylene compounds possessing nitrogen, carboxyl, phosphorus, mercapto, and carbonyl groups alpha to the aliphatically unsaturated carbon atoms, thus making the disclosure in U.S. Pat. No. 3,445,420 significantly different than the present disclosure. The discovery disclosed herein, i.e. inhibition by acetylenedicarboxylates ROOCC≡CCOOR, wherein R is a monovalent hydrocarbon radical, clearly does not fall within the scope of the previously patented compositions.

Therefore, a primary object of the present invention is to provide a solventless composition which will render surfaces non-adherent to materials which would normally adhere thereto.

Another object of the present invention is to provide a solventless coating composition which will cure to a coating having satisfactory smear, rub-off, migration and release characteristics.

Another object of the present invention is to provide a solventless coating composition which has a satisfactory pot-life or bath-life in its catalyzed form when it is ready for use.

Another object of the present invention is to provide a method of rendering materials nonadherent to other materials which would normally adhere thereto.

Another object is to provide articles of manufacture having nonadherent surfaces by coating the surfaces with the release compositions of the present invention.

Another object of the present invention is to provide a release coating composition having a one-part inhibitor which effectively retards the catalyzed crosslinked reaction at temperatures below the heat cure temperature of these compositions and to provide solventless silicone compositions which are particularly well suited for paper release applications.

These and other objects will become apparent to those skilled in the art upon consideration of the present specification, examples and claims.

SUMMARY OF THE INVENTION

The present invention provides a silicone paper release coating composition containing a dialkylacetylenedicarboxylate inhibitor agent which is effective for retarding a precious metal catalyzed addition cure hydrosilation reaction at room temperature but which will effectively cure at elevated temperature thereby forming a silicone coating which will tenaciously adhere to a substrate such as paper to which it is applied but will render said substrate substantially nonadherent to materials such as pressure sensitive adhesives which would normally adhere thereto.

The release coating composition of the present invention is comprised of:

a. an olefinorganopolysiloxane having structural units of the formula:

  (I)

and b. an organohydrogenpolysiloxane having structural units of the formula:

  (II)

wherein R is an organic radical attached to silicon by a C—Si linkage and is selected from the group consisting of monovalent hydrocarbon radicals, halogenated monovalent, hydrocarbon radicals, and cyanoalkyl radicals; generally, R contains from 1–30 carbon atoms, straight or branched chained, preferably from 1–12 carbon atoms, and most preferably 1–8 carbon atoms; R' is an olefinic hydrocarbon radical attached to silicon by a C—Si linkage and generally contains from 1–20 aliphatic carbons, straight or branch chained, and preferably 1–12 carbon atoms, linked by multiple bonds (e.g., vinyl, allyl, methallyl, butenyl, pentenyl, ethenyl and the like); a has a value of 0 to 3, inclusive, and preferably from 0.5 to about 2, inclusive, b has a value from 0.005 to 2.0, inclusive, and the sum of a and b is equal to from 0.8 to 3, inclusive wherein the release coating composition is a fluid at room temperature having a viscosity of, approximately, 25 to 5000 centipoise and preferably 300 to 1000 centipoise at 25° C., c. a sufficient amount of precious metal catalyst, especially platinum and rhodium catalysts, to cause the co-reaction of (a) and (b), and d. an amount of dialkylacetylenedicarboxylate effective for inhibiting an addition cure hydrosilation reaction between said olefinorganopolysiloxane and said organohydrogenpolysiloxane. The dicarboxylate has the general formula ROOCC≡CCOOR where R is as defined above and is present in an amount to inhibit premature gelation of the catalyzed co-reaction product of (a) and (b) but is present in an amount insufficient to prevent curing of said coating composition at elevated temperatures.

DESCRIPTION OF THE INVENTION

The composition of the present invention is particularly well suited for rendering materials nonadherent to other normally adherent materials such as glue and adhesives. Additionally, the composition can be applied directly to a substrate without the need for a solvent, thus avoiding all of the problems associated with coating solvents as described above.

The composition is an organopolysiloxane made up of several constituent ingredients which will adhere to and thermally cure on the substrate upon which it is coated, and render the substrate nonadherent.

In particular, the olefinorganopolysiloxanes having structural units represented by Formula I hereinabove are intended to broadly cover low viscosity fluid organopolysiloxanes suitable for coating which preferably, but not necessarily, are free of silanic hydrogen, and contain olefinic unsaturation by means of double or triple bonds between two adjacent aliphatic carbon atoms. Among the radicals which R represents in Formula I hereinabove are included alkyl, such as methyl, ethyl, propyl, isopropyl, butyl, octyl, dodecyl, and the like; cycloalkyl, such as cyclopentyl, cyclohexyl, cyclopeptyl, and the like; aryl, such as phenyl, naphthyl, tolyl, xylyl, and the like; aralkyl, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; and cyanoalkyl, such as beta-cyano ethyl, gamma-cyanopropyl, beta-cyanopropyl and the like. Preferably R is methyl. Moreover, Formula I is intended to include those materials wherein R is a mixture of the aforesaid radicals.

Among the radicals represented by R' in Formula I hereinabove are included alkenyl, such as vinyl, allyl, methallyl, butenyl, pentenyl, and the like; and alkynyl, such as ethynyl, propynyl, butynyl, pentynyl and the like. Preferably R' is vinyl or allyl and most preferably R' is vinyl.

These olefinorganopolysiloxanes encompassed within the scope of Formula I hereinabove are well known in the art, as particularly manifested by U.S. Pat. No. 3,344,111 to Chalk, and U.S. Pat. No. 3,436,366 to Modic, which are incorporated herein by reference. Similarly, their preparation and commercial availability is also well known.

The olefinorganopolysiloxanes encompassed within the scope of the present invention can be characterized as copolymers of (1) siloxane units having the formula:

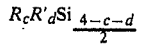  (IV)

where R and R' are as defined above and c has a value of from 0 to 2, inclusive, and the sum of c and d is equal to from 0.8 to 3.0, inclusive, and (2) organosiloxane units having the structural formula:

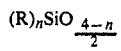  (V)

where R is as defined above and n has a value of from 0.8 to 2.5, inclusive. Thus, where the olefinorganopolysiloxane employed herein is a copolymer of units within the scope of Formula IV with an organopolysiloxane having an average formula within the scope of Formula V, the copolymer generally contains from 0.5 to 99.5 mole percent of the units of Formula IV, and from 0.5 to 99.5 mole percent of units within the scope of Formula V. The preparation of these copolymers is also well known in the art. A major proportion of the composition is typically a vinyl chainstopped polysiloxane having the general formula:

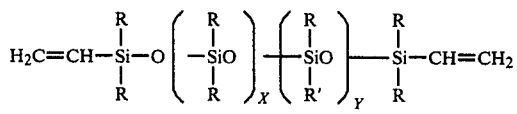

wherein R is a monovalent hydrocarbon radical free of unsaturation. Suitable radicals for R include, for example, methyl, ethyl, propyl, butyl, and other similar unsaturated hydrocarbons, but ordinarily would not include phenyl groups for paper release purposes. R' is a hydrocarbon radical having alkenyl unsaturation. Typically, R' represents vinyl groups but may also represent allylic or cycloalkenyl unsaturated groups. X and Y are positive integers so that the vinyl chainstopped polysiloxane has up to approximately 20% by weight of R' groups. The viscosity of such a polysiloxane ranges from approximately 50 to approximately 100,000 centipoise at 25° C. Preferably, the vinyl chainstopped polysiloxane has up to approximately 20% by weight of vinyl groups represented by R' and the viscosity of this polymer ranges from approximately 300 to approximately 550 centipoise at 25° C. The preferred vinyl chainstopped polysiloxane has the general formula:

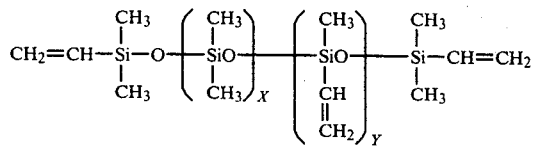

wherein X and Y are as described above.

Methylhydrogen fluid is often used by those skilled in the silicone art as a crosslinking agent for addition-cured silicone systems. Particularly useful as a crosslinking agent for the present invention is a trimethyl chainstopped polymethylhydrogen siloxane fluid having from approximately 10% to approximately 100% SiH groups with the remainder being essentially dimethylsiloxy units and having a viscosity in the range of approximately 25 to approximately 1,000 centipoise at 25° C.

The organohydrogenpolysiloxanes having structural units represented by Formula II hereinabove are intended to broadly cover fluid organopolysiloxanes which are preferably, but not necessarily, free of olefinic unsaturation, but which contain silanic hydrogen. These organohydrogenpolysiloxanes represented by Formula II hereinabove are also well known in the art as particularly manifested by U.S. Pat. No. 3,344,111 to Chalk, and U.S. Pat. No. 3,436,366, incorporated herein by reference.

Among the radicals represented by R in Formula II, hereinabove, similarly to R in Formula I hereinabove, are included alkyl, such as methyl, ethyl, propyl, isopropyl, butyl, octyl, and the like; cycloalkyl, such as cyclopentyl, cyclohexyl, cycloheptyl and the like; aryl, such as phenyl, naphthyl, tolyl, xylyl, and the like, aralkyl, such as benzyl, phenylethyl, phenylpropyl, and the like; halogenatged derivatives of the above radicals, including chloromethyl, trifluoromethyl, chloropropyl, chlorophenyl, dibromophenyl, tetrachlorophenyl, difluorophenyl and the like; and cyanoalkyl, such as beta-cyanoethyl, gamma-cyanopropyl, beta-cyanopropyl and the like. Also intended to be included within the scope of Formula II are those materials where R is a mixture of the aforesaid radicals. Preferably the R group of Formula II is methyl.

Materials specifically encompassed within Formula II hereinabove, include 1,3-dimethyldisiloxane, 1,1,3,3-tetramethyldisiloxane, as well as higher polymers containing up to 100,000 or more silicon atoms per molecule. Also included within the scope of Formula II hereinabove are cyclic materials, such as cyclic polymers of methyl hydrogen siloxane having the formula:

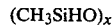

wherein x is a whole number equal to from 3 to 10 or more. Particularly included is tetramethylcyclotetrasiloxane.

The organohydrogenpolysiloxanes employed in the practice of the present invention can also be characterized as copolymers containing at least one unit per molecule having the formula:

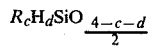  (VI)

with the remaining siloxane units in the organopolysiloxane being with in the scope of Formula V hereinabove, where R, c, d and n are defined above.

Within the scope of Formula VI are siloxane units, such as hydrogen siloxane units $(H_2SiO)_{1.5}$, methyl hydrogen siloxane units $(HSiCH_3O)$, dimethyl hydrogen siloxane units, and dihydrogen siloxane units $(H_2SiO)$. In these copolymers, the siloxane units of Formulae V and VI are present in proportions so as to form a hydrogenpolysiloxane within the scope of Formula II hereinabove. In general, these copolymers contain from 0.5 to 99.5 mole percent of the siloxane units of Formula V with from 0.5 to 99.5 mole percent of the siloxane units of Formula VI.

Ordinarily for release coating purposes it is preferred that the organohydrogenpolysiloxane crosslinker be essentially a trimethyl chainstopped methylhydrogenpolysiloxane fluid having a viscosity of, approximately 10 to 500 centipoise at 25° C. and a hydrogen content of, approximately, 0.1 to 1.67 weight percent.

The precious metal catalyst component employed in the compositions of the present invention includes all of the well known platinum-metal catalysts which are effective for catalyzing the reaction between silicon-bonded hydrogen groups and silicon-bonded olefinic groups, and which are freely miscible in solvent-free silicone polymers. These materials include, for example, the platinum hydrocarbon complexes shown in U.S. Pat. No. 3,159,601 to Ashby and U.S. Pat. No. 3,159,662 to Ashby, as well as the platinum alcoholate catalysts described in U.S. Pat. No. 3,220,972 to Lamoreaux. Moreover, the platinum chloride-olefin complexes described in U.S. Pat. No. 3,516,946 to Modic are also useful herein. All of the aforesaid U.S. patents are intended to be incorporated herein by reference.

The curing reaction which takes place between the vinylfunctional polysiloxane and the polymethylhydrogensiloxane fluid crosslinking agent is an addition cure reaction, also known as a hydrosilation. The composition of the present invention may be thermally cured by means of a platinum catalyzed crosslinking reaction between pendant vinyl groups of a dialkylvinyl chainstopped polydialkyl-alkylvinylsiloxane copolymer and a trimethyl chainstopped polymethylhydrogen fluid.

A particularly useful catalyst for facilitating the hydrosilation curing reaction is the Lamoreaux catalyst as described in U.S. Pat. No. 3,220,972 issued Nov. 30, 1965, and assigned to the same assignee as the present invention. Other platinum-metal catalysts can also be utilized in practicing the present invention and their selection depends upon such factors as speed of the reaction required as well as expense, useful pot-life and the temperature at which the cure reaction is to take place. Such platinum-metal catalysts include those which are silicone-soluble complex compounds of the metals ruthenium, rhodium, palladium, osmium, iridium and platinum. For coating compositions as described above, the amount of catalyst ranges from approximately 10 to approximately 500 ppm (as weight of metal atoms), again depending upon the factors of speed of reaction and cost. Preferably, the amount of catalyst is approximately 10-50 ppm of precious metal.

A vinyl chainstopped polysiloxane with a trimethyl chainstopped polymethylhydrogensiloxane fluid crosslinking agent thermally cures on a substrate and provides a nonadherent surface. It is thus necessary to include an inhibitor in the coating composition package in order to avoid the problems of premature cure or gelation described earlier. It has been found that dialkylacetylenedicarboxylates which have the general formula:

ROOCC≡CCOOR effectively inhibit the cure of these coating compositions at ambient temperatures below the heat cure temperatures of the compositions. The product thus exhibits a workable pot-life in excess of the time ordinarily required to use the product. That is to say, at room temperature, this complete coating composition does not exhibit the premature gelling often associated with catalyzed silicone compositions. Furthermore, dialkylacetylenedicarboxylate does not exhibit the disadvantageous properties associated with previously used inhibitors. Furthermore, dimethylacetylenedicarboxylate is a one-part hydrosilation inhibitor package as opposed to a two-part inhibitor package previously used which consisted of equal parts of vinyl acetate and triallylisocyanurate (TAIC). As noted, this two-part inhibitor is less satisfactory since the vinyl acetate is not only quite volatile but is very flammable; and although TAIC is not very volatile, it is only barely soluble in the vinyl silicone base polymer utilized in practicing the present invention.

It has been discovered that small amounts of dialkylacetylenediacraboxylate inhibitor permit exceptionally long catalyzed pot-life without sacrifice of cure performance in a solventless paper release system. Ordinarily, the effective amount of inhibitor ranges from approximately 0.05% to approximately 1.0% by weight, and preferably from 0.1 to 0.25% by weight. Use of the inhibitor of the present invention results in adequate pot-life yet the composition rapidly cures to a smear-free and migration-free nonadherent surface when thermally cured.

A heat cure reaction can be initiated in many ways such as by infrared lamps or by radiation, but often a forced air oven is most suitable. The composition of the present invention can be applied to substrates in many ways such as by coating, spraying, brushing, application by blade or gravure processes. The present invention thus provides a method for rendering surfaces nonadherent to materials which would ordinarily adhere thereto by the application of the above-described compositions to a suitable substrate. Such substrates include glass, metal and metal foil, and fibrous materials, particularly paper. Any plastic which will not melt or deform at the temperature required to cure the composition of the present invention can also be rendered nonadherent by application of the above-described composition to the plastic surface.

The inhibitors utilized by the present invention are dialkylacetylenedicarboxylates which result from the diesterification reaction of 2-butynoic dicarboxylic acid with two equivalents of alcohols such as methanol, ethanol, butanol, benzylic alcohol, allyl alcohol or mixtures of such alcohols. Such reactions can be represented as:

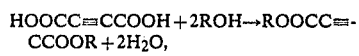

HOOCC≡CCOOH+2ROH→ROOCC≡-CCOOR+2H$_2$O, or

HOOCC≡CCOOH+ROH+R'OH→ROOCC≡-CCOOR'+2H$_2$O.

Useful diesters prepared in this fashion include dimethylacetylenedicarboxylate, diethylenedicarboxyulate, dibutylacetylenedicarboxylate, methylbutylacetylenedicarboxylate, methylethylacetylenedicarboxylate, etc. Particularly useful for the practice of the present invention are those diesters where R represents methyl or ethyl groups.

Effective levels of dimethylacetylenedicarboxylate are quite soluble in silicone fluids, and it is not significantly volatile, having a boiling point above 200° C. at atmospheric pressure. Additionally, dimethylacetylenedicarboxylate is readily available commercially. Furthermore, inasmuch as the total inhibitor concentration in the dimethylacetylenedicarboxylate-inhibited polysiloxane amounts to about one-fourth the inhibitor concentration for previously used blends of vinyl acetate and TAIC, the total cost is significantly reduced. Additionally, the small inhibitory amounts of dimethylacetylenedicarboxylate utilized by the present invention will be substantially wholly included within the crosslinked polymer. Thus free dimethylacetylenedicarboxylate is not extant after the polymeric composition is cured.

Dimethylacetylenedicarboxylate will also effectively inhibit the platinum catalyzed condensation cure reaction for polysiloxane compositions having silanol functionality as well as inhibit the cure for those compositions exhibiting both silanol and vinyl functionality. A base polymer for such a composition can be, for example, a silanol chainstopped polydiorganosiloxane having pendant vinyl groups along the siloxane chain.

Experiments described below establish that dimethylacetylenedicarboxylate is an inhibitor for certain rhodium catalysed addition-cure compositions as well as for the previously detailed platinum-catalysed materials. Two different rhodium complex catalysts were prepared for evaluation in 100% solids silicone paper release applications and dimethylacetylenedicarboxylate was found to function as an inhibitor for each catalyst.

In order that those skilled in the art might be better able to practice the present invention, the following examples are given by way of illustration and not by way of limitation.

DESCRIPTION OF THE PREFERRED EMBODIMENTS

EXAMPLES 1 TO 7

In the following examples, two types of polysiloxane base polymer were catalyzed with each of two types of platinum catalyst. The effect of varying amounts of dialkylacetylenedicarboxylate inhibitors is examined for each of the catalyzed compositions.

Base polymer designated A-300 is an approximately 300 centipoise dimethylvinylsiloxy chainstopped linear polydimethylmethylvinylsilicone copolymer in which approximately 3.7 weight percent of the polymeric units are methylvinylsiloxy units. The base polymer designated B-1000 is essentially the same material as A-300 but has an approximate viscosity of 1000 centipoise at 25° C. These polysiloxane materials are produced by well known means such as the KOH equilibration of methyltetramer, methylvinyltetramer and dimethylvinyl chainstoppers.

Catalysts I is a platinum complex of octanol which provides approximately 3.5 weight percent platinum, as taught by Lameroux in U.S. Pat. No. 3,220,972. Catalyst II is a platinum complex of sym-divinyltetramethyldisiloxane which provides approximately 5 weight percent platinum as taught by Karstedt in U.S. Pat. No. 3,814,730. In the following examples 0.07 weight percent of Catalyst I and 0.02 weight percent of Catalyst II were utilized based upon the weight of the selected base polymer. In these examples Catalyst I or II was added to base polymer A-300 or B-1000 and stirred under vacuum at 55° C. for two hours. The base polymer-catalyst blend was then cooled to below 40° C. and a specified amount of dimethylacetylenedicarboxylate (DMAD) or diethylacetylenedicarboxylate (DEAD) was added to each blend and stirred under vacuum for an additional hour. These blends were then mixed with the 3 weight percent of methylhydrogen functional crosslinker. The methylhydrogen crosslinker used in these experiments is a low viscosity trimethylsilyl chainstopped polymethylhydrogen siloxane fluid having an approximate hydrogen content of 1.67 percent by weight and a viscosity of approximately 25 centipoise at room temperature. Next the blends were coated onto Super Calendared Kraft paper by means of a doctor blade and cured at 350° F. in a forced air oven. The coatings were then inspected for evidence of smear and migration to establish the minimum required cure time. Evidence of smear is indicative of improper or incomplete cure. Migration occurs when particles of the release coating adhere insufficiently to the substrate and thereby tend to migrate onto whatever surface to which they are contacted. Bath stability was determined by measuring the increase in viscosity at 73° F. as a function of time for a catalyzed bath over a six hour period. Note that for these purposes, the crosslinking agent was added at time zero. The results of these experiments are shown in Table I.

TABLE I

| Example | Base Polymer | Catalyst | % Inhibitor | 350° F. Cure Time* | Viscosity Increase** |
|---|---|---|---|---|---|
| 1 | B-1000 | II | 0.5 DMAD | 60 | 3% |
| 2 | B-1000 | I | 0.5 DMAD | 45 | 2% |
| 3 | B-1000 | I | 0.1 DMAD | 20 | 37% |
| 4 | A-300 | I | 0.07 DEAD | 15 | 60% |
| 5 | A-300 | II | 0.06 DMAD | 15 | 19% |
| 6 | A-300 | II | 0.04 DMAD | 12 | 63% |
| 7 | A-300 | I | 0.02 DMAD | 15 | 200% |

*Minimum time in seconds required for good cure on SCK at 350+ F.
**Percent increase after 6 hours at 73° F.

Thus it can be seen that varying amounts of DMAD and DEAD inhibitors gave satisfactory cure times while effectively controlling the percentage viscosity increase of the catalyzed baths.

EXAMPLES 8 TO 12

The following 100% solids paper release compositions were formulated utilizing A-300 (300 cps.) dimethylvinyl chainstopped methylvinylpolysiloxane fluid as base polymer. Each composition was completed by addition of 0.02% Catalyst II platinum catalyst and varying amounts of dimethylacetylenedicarboxylate as follows:

Example 8: —0.5% Dimethylacetylenedicarboxylate
Example 9: —0.1% Dimethylacetylenedicarboxylate
Example 10: —0.06% Dimethylacetylenedicarboxylate
Example 11: —0.04% Dimethylacetylenedicarboxylate
Example 12: —0.03% Dimethylacetylenedicarboxylate These formulations were then blended with 3% of the same crosslinker utilized in Examples 1 to 7 above, a methylhydrogenpolysiloxane fluid, and hand-coated (as 100% solids) on 40 lb. Super Calendered Kraft paper and cured in a forced-air oven at 350° F. to a smear and migration-free nonadherent coating. The percent increase in viscosity of the coating baths over a six hour period was also noted. The following chart tabulates minimum cure time needed at 350° F. to effect a good cure, along with the percent viscosity increase of the coating baths at 25° C. over a six hour time period:

TABLE 2

| Example | At 350° Minimum Cure Time, Sec. | 6 Hour % Viscosity Increase |
|---|---|---|
| 8 | 60 | 3 |
| 9 | 15 | 6 |
| 10 | 12 | 35 |

TABLE 2-continued

| Example | At 350° Minimum Cure Time, Sec. | 6 Hour % Viscosity Increase |
|---|---|---|
| 11 | 10 | 63 |
| 12 | 10 | 145 |

It is clear from these results that a very small amount of dimethylacetylenedicarboxylate inhibitor (e.g. 0.04–0.06%) will prevent gelation of the coating bath without lengthening the curing time to an unacceptable extent when used in the solventless paper release coatings of the present invention.

EXAMPLES 13-16

A rhodium catalyst was prepared in the manner taught by Chalk and Harrod in U.S. Pat. No. 3,296,291. 0.2 grams rhodium trichloride hydrate was dispersed in 25 grams ethanol. 5 grams 1-octene were then added, and the complete reaction mixture was refluxed at 76° C. for 6 hours. A clear ethanolic solution, dark red in color, was obtained, containing approximately 2600 ppm rhodium metal. A sufficient amount of rhodium catalyst solution was added to a 300 cps. viscosity linear dimethylvinylsiloxy chainstopped polydimethyl-methylvinylsiloxane copolymer fluid containing approximately 3.7 weight percent methylvinylsiloxy units on the polymer chain (base polymer A-300) to provide 25 ppm Rh in the mixture. This was the mixture of Example 13. Other compositions were prepared precisely as for Example 13, but contained varying levels of dimethylacetylenedicarboxylate. These compositions were evaluated for cure performance on 40 lb. Super Calendered Kraft paper (SCK), as well as for catalysed pot-life performance, as described above. Results are shown in Table 3:

TABLE 3

| Composition | % DMAD | Cure Speed, Sec. 300° F. | 350° F. | 6 Hour Pot-life % Viscosity Increase |
|---|---|---|---|---|
| Example 13 | 0 | 20 | 10 | Gelled in 1 hour |
| Example 14 | 0.03 | 30 | 15 | Gelled in 4 hours |
| Example 15 | 0.06 | 30 | 15 | 86% |
| Example 16 | 0.10 | 30 | 20 | 7% |

It is apparent that the addition of as little as 0.1% dimethylacetylenedicarboxylate provides excellent pot-life to solventless compositions in which the curing catalyst is a rhodium-octene complex compound.

EXAMPLE 17-23

The efficacy of dimethylacetylenedicarboxylate as an inhibitor for a different rhodium catalyst was also established. Tris (dialkylsulfide) trihalorhodium (III) complexes are known to be effective hydrosilation catalysts as demonstrated by Chandra and Rowlan, U.S. Pat. No. 3,928,629).

Accordingly, the complex Rh(Et$_2$S)$_3$Cl$_3$ was prepared in accordance with the method of Fergusson et al. (J. Chem. Soc. 1965, 2627) and introduced into the same vinyl-silicone fluid as described above to furnish solvent-free compositions having 25 ppm Rh (as the metal) with varying levels of dimethylacetylenedicarboxylate. These experimental materials were evaluated for cure and catalysed pot-life in the same fashion as noted above, with the result shown in Table 4:

TABLE 4

| Example | % DMAD | Cure Speed, Sec. 300° F. | 350° F. | 6 Hour Pot-life % Viscosity Increase |
|---|---|---|---|---|
| Control | 0 | 15 | 10 | Gelled in 90 minutes |
| 17 | 0.02 | 15 | 10 | 12% |
| 18 | 0.04 | 10 | 15 | 11% |
| 19 | 0.05 | 20 | 15 | 9% |
| 20 | 0.06 | 30 | 15 | 10% |
| 21 | 0.07 | 30 | 15 | 8% |
| 22 | 0.08 | 30 | 15 | 6% |
| 23 | 0.20 | 30 | 15 | 0% |

Thus it can be seen that dimethylacetylenedicarboxylate is a more effective inhibitor of Rh(R$_2$S)$_3$X$_3$ type catalyst than of the rhodium-octene catalyst described above. In the above formula R represents alkyl groups and X represents halogen atoms.

What is claimed as new and desired to be protected by Letters Patent of the United States is:

1. A silicone release coating composition having improved catalyzed bath life at ambient temperatures comprised of:

a. an olefinorganopolysiloxane having units of the structural formula $$R_aR'_b SiO_{\frac{4-a-b}{2}}$$

b. an organohydrogenpolysiloxane having units of the structural formula $$R_aH_b SiO_{\frac{4-a-b}{2}}$$

wherein R is selected from the group consisting of a monovalent hydrocarbon radical, a halogenated monovalent hydrocarbon radical, a cyanoalkyl radical and mixtures thereof, R' is an olefinic hydrocarbon radical, wherein a has a value of from 0 to 3, inclusive, b has a value of from 0.005 to 2.0, inclusive, and the sum of a and b is equal to from 0.8 to 3, inclusive;

c. a sufficient amount of a precious metal catalyst to cause the co-reaction of (a) and (b); and d. a dialkylacetylenedicarboxylate having the general formula
ROOCC≡CCOOR where R is as defined above and wherein said dialkylacetylenedicarboxylate is present in an amount effective for inhibiting premature gelation but insufficient for preventing cure at elevated temperature; wherein said silicone release coating composition has a viscosity of, approximately, 25 to 5000 centipoise at 25° C.

2. A composition as in claim 1 wherein said olefinorganopolysiloxane is a dimethylvinyl chainstopped dimethylmethylvinylpolysiloxane copolymer fluid having a viscosity of, approximately, 300 to 1000 centipoise at 25° C. and a vinyl content of, approximately, 0.1 to 2.5 weight percent.

3. A composition as in claim 1 wherein said organohydrogenpolysiloxane is a trimethyl chainstopped methylhydrogenpolysiloxane fluid having a viscosity of, approximately, 10 to 500 centipoise at 25° C. at a hydrogen content of, approximately, 0.1 to 1.67 weight percent.

4. A composition as in claim 1 wherein said precious metal catalyst is selected from the group consisting of platinum metal, rhodium metal and complexes of platinum metal and rhodium metal.

5. A composition as in claim 4 wherein said precious metal catalyst is present in an amount sufficient to provide, approximately, 5 to 500 parts platinum or rhodium metal per million parts of said olefinorganopolysiloxane.

6. A composition as in claim 1 wherein said dialkylacetylenedicarboxylate is present in an amount of, approximately, 0.02 to 1.0 weight percent of the silicone coating composition.

7. A composition as in claim 1 wherein said dialkylacetylenedicarboxylate is selected from the group consisting of dimethylacetylenedicarboxylate, diethylacetylenedicarboxylate, and methylethylacetylenedicarboxylate, dibutylacetylenedicarboxylate, and methylbutylacetylenedicarboxylate.

8. A composition as in claim 1 further comprising a substrate upon which said silicone coating composition has been coated and thermally cured.

9. A composition as in claim 8 wherein said substrate is paper.

10. A process for rendering surfaces nonadherent to materials which would normally adhere thereto comprising the steps of:
A. providing a silicone release coating composition by combining:
a. an olefinorganopolysiloxane having units of the structural formula:

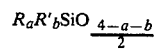

b. an organohydrogenpolysiloxane having units of the structural formula:

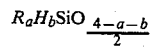

wherein R is selected from the group consisting of a monovalent hydrogen radical, a halogenated monovalent hydrocarbon radical, a cyanoalkyl radial and mixtures thereof, R' is an olefinic hydrocarbon radical, wherein a has a value of from 0 to 3, inclusive, b has a value of from 0.005 to 2.0, inclusive, and the sum of a and b is equal to from 0.8 to 3, inclusive;
c. a sufficient amount of a precious metal catalyst to cause the co-reaction of (a) and (b); and
d. a dialkylacetylenedicarboxylate having the general formula:

where R is as defined above and wherein said dialkylacetylenedicarboxylate is present in an amount effective for inhibiting premature gelation but insufficient for preventing cure at elevated temperature; wherein said silicone release coating has a viscosity of, approximately, 25 to 5000 centipoise at 25° C.;
B. Coating said silicone release coating on a suitable surface at a thickness of, approximately, 0.05 to 2.0 mils;
C. Curing said silicone release coating with an amount of heat effective for overcoming the cure retarding properties of said dialkylacetylenedicarboxylate.

11. A process as in claim 10 wherein said olefinorganopolysiloxane is a dimethylvinyl chainstopped dimethylmethylvinylpolysiloxane copolymer fluid having a viscosity of, approximately, 300 to 1000 centipoise at 25° C. and a vinyl content of, approximately, 0.1 to 25 weight percent.

12. A process as in claim 10 wherein said organohydrogenpolysiloxane is a trimethyl chainstopped methylhydrogenpolysiloxane fluid having a viscosity of, approximately, 10 to 500 centipoise at 25° C. and a hydrogen content of, approximately 0.1 to 1.67 weight pecent.

13. A process as in claim 10 wherein said precious metal catalyst is selected from the group consisting of platinum metal, rhodium metal and complexes of platinum metal and rhodium metal.

14. A process as in claim 13 wherein said precious metal catalyst is present in an amount sufficient to provide, approximately, 5 to 500 parts platinum or rhodium metal per million parts of said olefinorganopolysiloxane.

15. A process as in claim 10 wherein said dialkylacetylenedicarboxylate is present in an amount of, approximately, 0.02 to 1.0 weight percent of the silicone coating composition.

16. A process as in claim 10 wherein said dialkylacetylenedicarboxylate is selected from the group consisting of dimethylacetylenedicarboxylate and diethylacetylenedicarboxylate.

17. A process as in claim 10 wherein the group of radicals represented by R also contains hydroxyl radicals.

18. A composition as in claim 1 wherein said olefinorganopolysiloxane is a dimethylvinyl chainstopped dimethylmethylvinylpolysiloxane copolymer fluid having a viscosity of, approximately, 1,000 to 100,000 centipoise at 25° C.

19. A process as in claim 10 wherein said olefinorganopolysiloxane is a dimethylvinyl chainstopped dimethylmethylvinylpolysiloxane copolymer fluid having a viscosity of, approximately, 1,000 to 100,000 centipoise at 25° C.

* * * * *